United States Patent
Jeong et al.

(10) Patent No.: US 11,878,715 B2
(45) Date of Patent: Jan. 23, 2024

(54) APPARATUS, SYSTEM AND METHOD FOR CONTROLLING SPACE OF VEHICLE

(71) Applicants: HYUNDAI MOTOR COMPANY, Seoul (KR); KIA MOTORS CORPORATION, Seoul (KR)

(72) Inventors: Jin Su Jeong, Suwon-si (KR); Dong Il Yang, Seoul (KR); Eun Young Choi, Seoul (KR); Ki Seok Seong, Cheonan-si (KR); Min Sang Yu, Hwaseong-si (KR); Hyeong Jin Ham, Seongnam-si (KR); Rosali Sun Pyun, Seongnam-si (KR); Pil Cheon Jang, Seongnam-si (KR); Woo Jin Kim, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 545 days.

(21) Appl. No.: 17/015,781

(22) Filed: Sep. 9, 2020

(65) Prior Publication Data

US 2021/0362744 A1    Nov. 25, 2021

(30) Foreign Application Priority Data

May 25, 2020   (KR) .................... 10-2020-0062222

(51) Int. Cl.
| | | |
|---|---|---|
| B60R 21/02 | (2006.01) | |
| B60W 60/00 | (2020.01) | |
| G06Q 10/02 | (2012.01) | |

(52) U.S. Cl.
CPC ....... *B60W 60/0013* (2020.02); *B60R 21/026* (2013.01); *B60W 60/00253* (2020.02); *G06Q 10/02* (2013.01)

(58) Field of Classification Search
CPC ........ B60W 60/0013; B60W 60/00253; B60R 21/026; G06Q 10/02
See application file for complete search history.

(56) References Cited

U.S. PATENT DOCUMENTS 11,170,459 B2 * 11/2021 Shah .................... G06Q 10/02
2022/0105847 A1 * 4/2022 Ushiro .................. B60R 5/00

* cited by examiner

*Primary Examiner* — Peter D Nolan
*Assistant Examiner* — Roy Rhee
(74) *Attorney, Agent, or Firm* — Morgan, Lewis & Bockius LLP

(57) ABSTRACT

An apparatus for controlling a space of a vehicle includes: a communication device to receive reservation information; and a controller to determine a manner of partitioning an inner space of the vehicle based on the reservation information and control an operation of one or more partition to correspond to the manner of partitioning the inner space, thereby allowing users moving similar routes to feel comfortable.

20 Claims, 14 Drawing Sheets

| PRIMARILY SELECTED SEAT | PRIMARILY REMOVED PARTITION | SECONDARILY SELECTED SEAT | SECONDARILY REMOVED PARTITION |
|---|---|---|---|
| A | NONE | B,D | PARTITION BETWEEN B AND D |
| B | NONE | C,D | PARTITION BETWEEN C AND D |
| C | NONE | A,B,D | PARTITION BETWEEN A AND B, PARTITION BETWEEN B AND D |
| D | NONE | A,C | PARTITION BETWEEN A AND C |
| A,B | PARTITION BETWEEN A AND B | D | NONE |
| A,C | PARTITION BETWEEN A AND C | B,D | PARTITION BETWEEN B AND D |
| A,D | NONE | C | NONE |
| A,D | PARTITION BETWEEN B AND D | A | NONE |
| A,B,C | PARTITION BETWEEN A AND B, PARTITION BETWEEN A AND C | D | NONE |
| A,B,D | PARTITION BETWEEN A AND B, PARTITION BETWEEN B AND D | C | NONE |
| B,D,C | PARTITION BETWEEN B AND D, PARTITION BETWEEN D AND C | A | NONE |
| A,B,C,D | ALL PARTITIONS REMOVED | SELECTION DIFFILCULT | N/A |

FIG. 3

APPARATUS, SYSTEM AND METHOD FOR CONTROLLING SPACE OF VEHICLE

CROSS-REFERENCE TO RELATED APPLICATION

This application claims the benefit of priority to Korean Patent Application No. 10-2020-0062222, filed in the Korean Intellectual Property Office on May 25, 2020, the entire contents of which are incorporated herein by reference.

TECHNICAL FIELD

The present disclosure relates to an apparatus, a system, and a method for controlling a space of a vehicle.

BACKGROUND

A car sharing service refers to a service allowing people having no vehicle to share vehicles together such that people can conveniently and rapidly use vehicles to destinations. Recently, as the number of people using the car sharing service has been increased, there occurs a situation in which the people get on the same vehicle to move when a moving route is similar. In this case, the people may feel uncomfortable because they have to drive with random people, until they arrive at their destinations. Accordingly, there is required a manner of allowing users having similar moving routes to move without feeling uncomfortable.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides an apparatus, a system, and a method for controlling a space of a vehicle, capable of minimizing that users having the same moving route feel uncomfortable when moving together by a shared vehicle, and of preventing an occupant from feeling uncomfortable and basically preventing a safety accident caused by an operation of a partition to divide a space, when the partition is provided in the state that a driver gets on the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a space of a vehicle includes: a communication device configured to receive first reservation information; and a controller configured to determine a manner of partitioning an inner space of the vehicle, based on the first reservation information and to control an operation of one or more partition to correspond to the manner of partitioning the inner space.

The controller prevents the operation of the partition from being controlled, when use of one of total seats inside the vehicle is determined as being selected based on the reservation information.

The controller performs a control operation to remove a partition between adjacent seats, when use of the adjacent seats is determined as being selected based on the reservation information.

The controller performs a control operation to remove total partitions, when use of total seats inside the vehicle is determined as being selected based on the reservation information.

The partition is provided at a position, which is to partition the inner space of the vehicle, depending on a position of a seat inside the vehicle.

The controller performs a control operation to open a door of only a seat, which is selected for use, based on the reservation information.

According to another aspect of the present disclosure, a system for controlling a space of a vehicle includes: a terminal to produce first reservation information; a server to receive the first reservation information from the terminal; and a vehicle space control apparatus to receive the first reservation information from the server, determine a manner of partitioning an inner space of the vehicle, and control an operation of one or more partition to correspond to the manner of partitioning the inner space.

The server receives reservation information only for remaining seats when use of total seats inside the vehicle is not determined as being selected.

The vehicle space control apparatus determines whether the operation of the partition is completed to correspond to the manner of partitioning the inner space before a user having reservation information, which is transmitted, gets on the vehicle.

The vehicle space control apparatus receives information on a request for the operation of the partition from the terminal and controls the partition to operate based on the information on the request for the operation of the partition, when the operation of the partition is not determined as being completed to correspond to the manner of partitioning the inner space before the user gets on the vehicle.

The vehicle space control apparatus controls the partition to operate based on the information on the request for the operation of the partition, which is received from the terminal, after the user gets on the vehicle.

The vehicle space control apparatus controls the partition to operate based on information on a request for the operation of the partition, which is received from the server, after the user gets on the vehicle.

According to another aspect of the present disclosure, a method for controlling a space of a vehicle includes: producing first reservation information in a terminal; receiving, by a server, the first reservation information from the terminal; receiving the first reservation information from the server; and determining a manner of partitioning an inner space of the vehicle to control an operation of one or more partition to correspond to the manner of partitioning the inner space.

In the receiving of the reservation information from the server, reservation information is received only for remaining seats when use of total seats inside the vehicle is not determined as being selected.

The method further includes determining whether the operation of the partition is completed to correspond to the manner of partitioning the inner space before a user having reservation information, which is transmitted, gets on the vehicle.

Information on a request for the operation of the partition is received from the terminal and the partition to operate is controlled based on the information on the request for the operation of the partition, when the operation of the partition is not determined as being completed to correspond to the manner of partitioning the inner space before the user gets on the vehicle.

In the controlling of the operation of the partition, a control operation to prevent the partition from being removed is performed, when use of one of total seats inside the vehicle is determined as being selected based on the reservation information.

In the controlling of the operation of the partition, a control operation to remove a partition between adjacent seats is performed when use of the adjacent seats is determined as being selected based on the reservation information.

In the controlling of the operation of the partition, a control operation to remove total partitions is performed when use of total seats inside the vehicle is determined as being selected based on the reservation information.

The method further includes performing a control operation to open only a door of a seat, which is selected for use, based on the reservation information, after controlling the operation of the partition.

BRIEF DESCRIPTION OF THE DRAWINGS

The above and other objects, features and advantages of the present disclosure will be more apparent from the following detailed description taken in conjunction with the accompanying drawings:

FIG. 3 is a view illustrating a manner of controlling a partition, according to an embodiment of the present disclosure;

DETAILED DESCRIPTION

Figure 1:
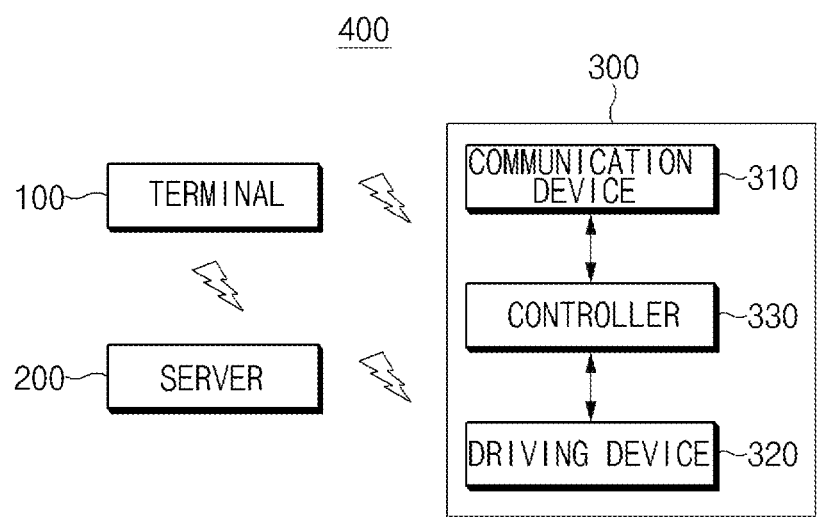
FIG. 1 is a view illustrating a configuration of a system for controlling a space of a vehicle, according to an embodiment of the present disclosure.

Hereinafter, exemplary embodiments of the present disclosure will be described in detail with reference to accompanying drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a vehicle space control system for controlling a space of a vehicle, according to an embodiment of the present disclosure.

As illustrated in FIG. 1, according to the present disclosure, a space control system 400 may include a terminal 100, a server 200, and an apparatus (vehicle space control apparatus) 300 for controlling the space of the vehicle.

The terminal 100 may produce reservation information based on an input of a user. The terminal 100 may include an input device to receive the input of the user including any one of control, an operation, and a voice of the user. According to an embodiment, the terminal 100 may be implemented with an electronic device (a smart phone, a smart pad, or a laptop computer). The terminal 100 may store an application to produce reservation information based on the input of the user. In this case, the reservation information may include vehicle information and seat information selected by the user. In addition, the terminal 100 may produce information on a request for removing a partition between a user and an occupant, when there is an input corresponding to a request for removing a partition of the user as the user gets to know an occupant having a seat adjacent to a seat of the user, after the user gets on the vehicle.

The server 200 may receive the produced reservation information from at least one terminal 100. In addition, the server 200 may match the reservation information, which is produced from the at least one terminal 100, to each vehicle, and may transmit the reservation information to the vehicle matched to the reservation information. To this end, the server 200 may make wireless communication with the terminal 100 and the vehicle. In addition, The server 200 may produce information on a request for removing a partition between a user and an occupant, when there is a history that the user has got on the vehicle with the occupant having the seat adjacent to the seat of the user, after the user gets on the vehicle based on a history of previously received reservations.

The vehicle space control apparatus 300 may include a communication device 310, a driving device 320, and a controller 330.

The communication device 310 may make wireless communication with the terminal 100 and the server 200, and the wireless communication may be performed through various wireless communication schemes including Global System for Mobile Communication (GSM), Code Division Multiple Access (CDMA), Wideband Code Division Multiple Access (WCDMA), Universal Mobile Telecommunication System (UMTS), Time Division Multiple Access (TDMA), or Long Term Evolution (LET).

The driving device 320 may drive a partition under the control of the controller 330. According to an embodiment, the driving device 320 may include an electric motor, and may allow a panel, which is to partition the space, to move along a rail.

The controller 330 may be implemented by various processing devices, such as a microprocessor embedded therein with a semiconductor chip to operate or execute various instructions, and may control the overall operation of the vehicle space control apparatus 300 according to an embodiment of the present disclosure. In detail, the controller 330 may determine a manner (space partitioning manner) of partitioning an inner space of the vehicle based on the reservation information, and control an operation of a partition to correspond to the manner of partitioning the inner space. In this case, the operation of the partition may include an operation to remove the partition to correspond to the manner of partitioning the inner space. First, the configuration of the partition will be described with reference to FIGS. 2A and 2B in more detail.

Figure 2A:
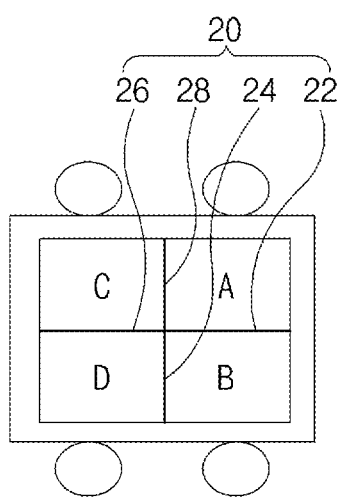
FIGS. 2A and 2B are views illustrating a partition to divide a space of a vehicle, according to an embodiment of the present disclosure.
Figure 2B:
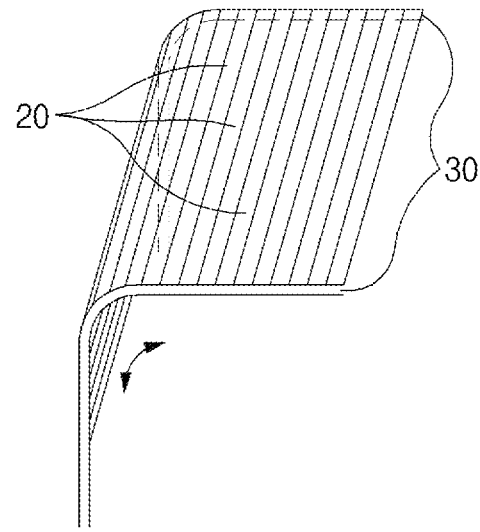

FIGS. 2A and 2B are views illustrating a partition to divide (partition) a vehicle space, according to an embodiment of the present disclosure.

As illustrated in FIGS. 2A and 2B, a partition 20 may be provided at a position to partition the inner space of the vehicle depending on the position of a seat. According to an embodiment, when seats A, B, C, and D are provided inside the vehicle, the partition may include a first partition 22 between the seat A and the seat B, a second partition 24 between the seat B and the seat D, a third partition 26 between the seat C and the seat D, and a fourth partition 28 between the seat A and the seat C. In addition, the partition 20 may move along a rail 30 depending on the operation of the driving device 320. According to an embodiment of the present disclosure, the partition 20 may be implemented in the shape to move along the shape of the rail 30. In addition, the partition 20 may be implemented in the form of a curtain-type airbag to reduce an impact or may be formed of a material to absorb an impact.

According to an embodiment of the present disclosure, the controller 330 may determine a seat, which is selected for use, of seats (e.g., seats A, B, C, and D of FIG. 2A) inside the vehicle, based on the reservation information, and may perform a control operation to remove the partition depending on the determination result. The details thereof will be made with reference to FIGS. 3 to 6.

FIG. 3 is a view illustrating a manner of controlling a partition, according to an embodiment of the present disclosure.

As illustrated in FIG. 3, the controller 330 may perform a control operation to prevent the partition from being removed, when any one of seats inside the vehicle is determined as being primarily selected based on the reservation information or seats, which are not adjacent to each other, are determined as being selected based on the reservation information. In addition, the controller 330 may perform a control operation to remove a partition between adjacent seats, when the adjacent seats are secondarily selected from remaining seats except for the seat which is primarily selected.

For example, the controller 330 may perform a control operation to prevent the partition from being removed, when any one of the seats A, B, C, and D is determined as being primarily selected. Thereafter, the controller 330 may perform a control operation to remove a partition between adjacent seats, when the adjacent seats are determined as being secondarily selected from remaining seats except for the seat which is primarily selected. Here, the adjacent seats may refer to two seats next to each other in a row or in a column, e.g., seat A and seat B, Seat B and seat D, seat C and seat D, seat A and seat C shown in FIG. 2A may be adjacent seats to each other.

For another example, the controller 330 may perform the control operation to remove a partition between the seats B and D, when the uses of the seats B and D are secondarily selected in the state that the seat A is primarily selected. For another example, the controller 330 may perform the control operation to remove partitions among the seats A, B, and D, when the uses of the seats A, B, and D are determined as being secondarily selected in the state that the seat D is primarily selected.

In addition, the controller 330 may perform a control operation to remove a partition between adjacent seats, when at least two seats, which are adjacent to each other, are determined as being primarily selected from seats inside the vehicle, based on the reservation information. In addition, the controller 330 may determine whether to remove a partition depending on the number of seats which are secondarily selected, when the seats are determined as being secondarily selected from remaining seats except for a seat which is primarily selected.

For example, the controller 330 may perform a control operation to remove a partition between selected seats, when the seat A and the seat B, the seat A and the seat C, or the seat B and the seat D, which are adjacent to each other, are determined as being primarily selected from seats inside the vehicle based on reservation information. In addition, the controller 330 may not determine that the partition is removed, when one seat (the seat D, C, or A) is determined as being secondarily selected from remaining seats except for the seat which is primarily selected. For example, the controller 330 may perform a control operation to remove a partition between adjacent seats, when adjacent two seats (the seats C and D, the seats B and D, or the seats A and C) are determined as being secondarily selected from remaining seats except for a seat which is primarily selected.

For another example, the controller 330 may perform a control operation to remove partitions among selected seats, when the seat A, the seat B, and the seat C, the seat A, the seat B, and the seat D, or the seat B, the seat D, and the seat C, which are adjacent to each other, are determined as being selected from seats inside the vehicle based on the reservation information. In addition, the controller 330 may not determine that the partition is removed, when seats are determined as being secondarily selected from remaining seats except for a seat primarily selected.

For example, the controller 330 may perform a control operation to remove all partitions among selected seats, when the seats A, B, C, and D which are adjacent to each other, are determined as being selected from seats inside the vehicle based on the reservation information.

Figure 4:
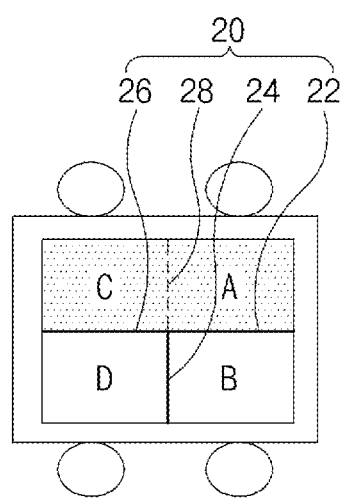
FIGS. 4 to 6 are views illustrating a manner of operating a partition, according to an embodiment of the present disclosure.
Figure 5:
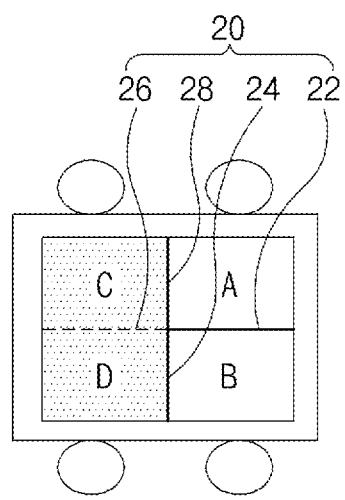
Figure 6:
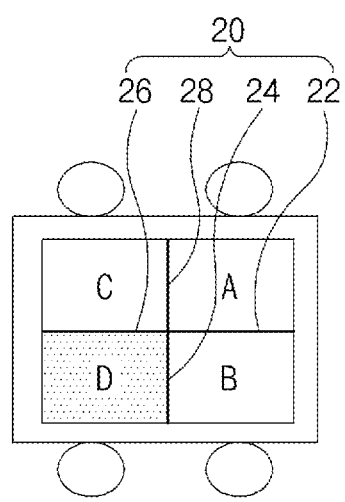

Hereinafter, the above-described operation of the controller 330 will be described with reference to FIGS. 4 to 6 in more detail. FIGS. 4 to 6 are views illustrating a manner of operating a partition, according to an embodiment of the present disclosure.

As illustrated in FIG. 4, the controller 330 may perform a control operation to remove the fourth partition 28 between the seat A and the seat C, and to prevent the first partition 22 between the seat A and the seat B, the second partition 24 between the seat B and the seat D, and the third partition 26 between the seat D and the seat C from being removed, when the seat A and the seat C are determined as being selected from the seats inside the vehicle based on the reservation information.

As illustrated in FIG. 5, the controller 330 may perform a control operation to remove the third partition 26 between the seat C and the seat D, and to prevent the first partition 22 between the seat A and the seat B, the second partition 24 between the seat B and the seat D, and the fourth partition 28 between the seat A and the seat C from being removed, when the seat C and the seat D are determined as being selected from the seats inside the vehicle based on the reservation information.

As illustrated in FIG. 6, the controller 330 may perform a control operation to prevent all partitions 22, 24, 26, and 28 from being removed, when only the seat D is determined as being selected from the seats inside the vehicle based on the reservation information.

The controller 330 may perform a control operation to open only a door of a seat, which is selected for use, when determining a manner of partitioning an inner space of the vehicle based on the reservation information, and controlling an operation of a partition to correspond to the manner of partitioning the inner space as described above. In other words, in FIG. 4, the controller 330 may control only doors of the seat A and the seat C to be open, when the seat A and the seat C are determined to be selected based on reservation information. In addition, in FIG. 5, the controller 330 may control only doors of the seat C and the seat D to be open, based on reservation information. Further, in FIG. 6, the controller 330 may control only a door of the seat D to be open, based on reservation information.

In addition, the controller 330 may determine whether the operation of the partition is completed to correspond to the space partitioning manner before a user having reservation information, which is transmitted, gets on a vehicle. In other words, the controller 330 may receive information on a request for the operation of the partition from the terminal 100 to control the partition to operate, based on the information on the request for the operation of the partition, when the operation of the partition is not determined as being completed to correspond to the space partitioning manner after the user gets on the vehicle. Accordingly, according to an embodiment of the present disclosure, the controller 330 may receive information on a request for the operation of the partition from the terminal 100 to control the partition to operate, when the operation of the partition is not determined as being completed based on reservation information, after the user having reservation information, which is transmitted, gets on the vehicle.

In addition, the controller 330 may receive information on a request for an operation of a partition from the terminal 100, when the information on the request for the operation of the partition is produced by the terminal 100, after a user is determined as getting on a vehicle. Alternatively, the controller 330 may receive information on a request for an operation of a partition from the server 200, when the information on the request for the operation of the partition is produced by the server 200. In addition, the controller 330 may control the operation of the partition based on information received from the terminal 100 and the server 200.

Figure 7:
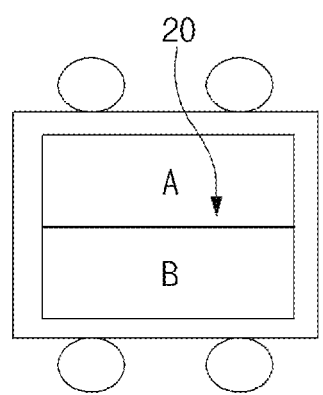
FIGS. 7 to 9 are views illustrating a partition to divide a space of a vehicle, according to another embodiment of the present disclosure.
Figure 8:
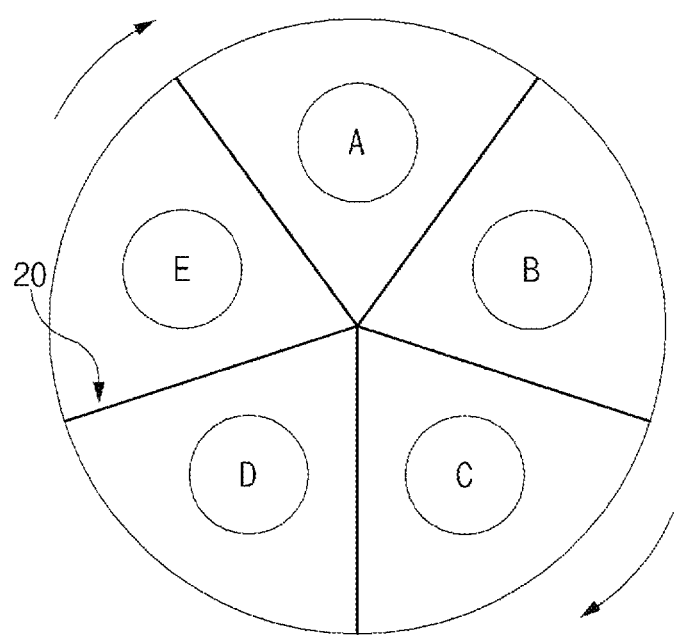
Figure 9:
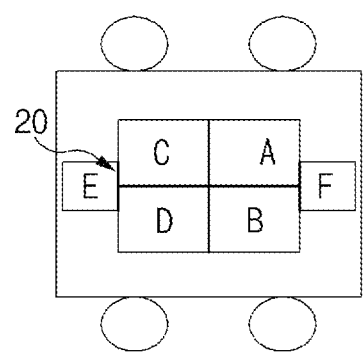

FIGS. 7 to 9 are views illustrating a partition to divide (partition) a vehicle space, according to another embodiment of the present disclosure.

As illustrated in FIG. 7, according to another embodiment of the present disclosure, when a seat A and a seat B are provided inside a vehicle, a partition 20 may be provided between the seat A and the seat B.

As illustrated in FIG. 8, according to another embodiment of the present disclosure, when seats inside a vehicle include seats A to E in the shape of a circle and a passenger compartment is designed to be in a rotatable structure, a partition 20 may be provided among the seats A to E, and the controller 330 may control a seat, which is selected by a user, to automatically rotate toward a sidewalk (in a direction for allowing the user to get on the vehicle).

As illustrated in FIG. 9, according to another embodiment of the present disclosure, when seats (seat E and seat F) are additionally placed at front and rear portions in an autonomous driving vehicle which does not require a driver seat, the partition 20 may be provided between seats, and may be additionally provided between the seat E and the seat C, between the seat E and the seat D, between the seat A and the seat F, and between the seat B and the seat F.

Figure 10:
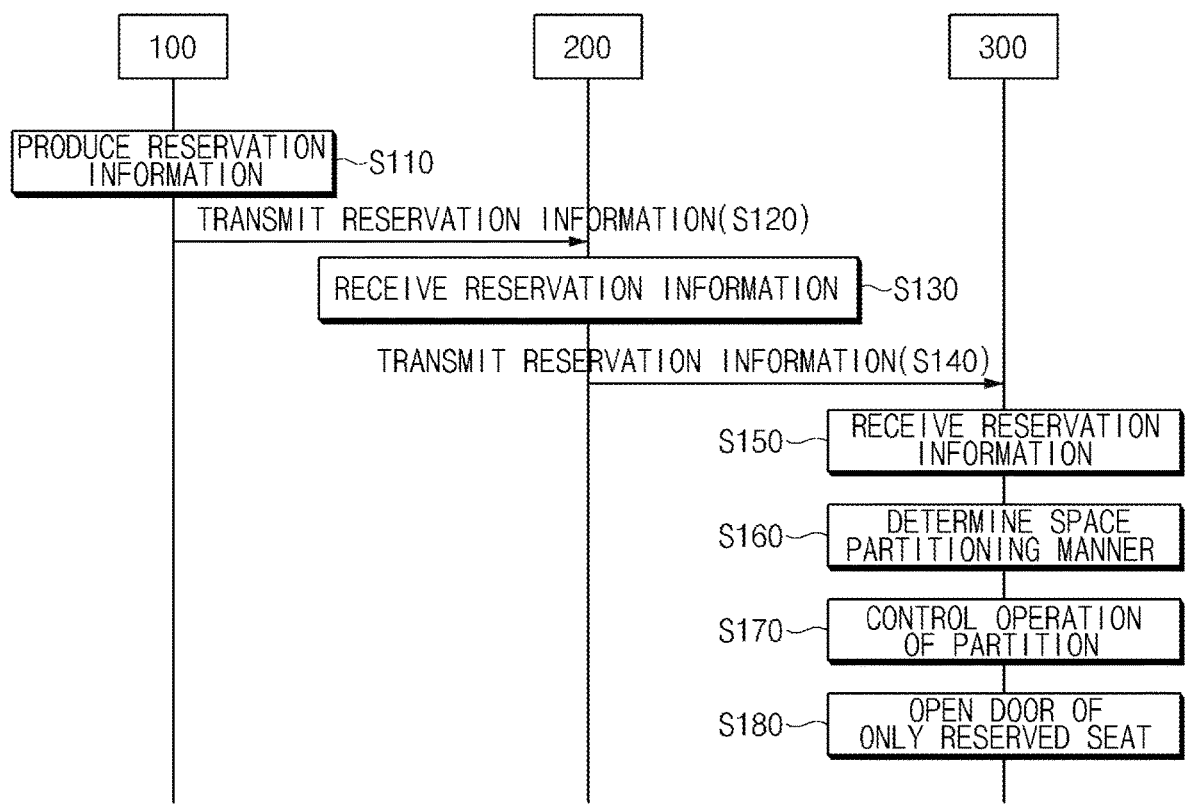
FIG. 10 is a flowchart illustrating an operating method of a system for controlling a space of a vehicle, according to an embodiment of the present disclosure.

FIG. 10 is a flowchart illustrating an operating method of a system for controlling a space of a vehicle, according to an embodiment of the present disclosure.

As illustrated in FIG. 10, the terminal 100 may produce reservation information based on an input of a user (S110). In S110, the terminal 100 may receive an input of a user including any one of control, an operation, and a voice of the user. According to an embodiment, the terminal 100 may be implemented with an electronic device (a smart phone, a smart pad, or a laptop computer). The terminal 100 may store an application to produce reservation information based on the input of the user. In this case, the reservation information may include vehicle information and seat information selected by the user. The terminal 100 transmits the reservation information, which is produced in S110, to the server 200 (S120).

The server 200 may receive the produced reservation information from at least one terminal 100 (S130). In addition, the server 200 may match the reservation information, which is produced from the at least one terminal 100, to each vehicle, and may transmit the reservation information to the vehicle matched to the reservation information (S140). To this end, the server 200 may make wireless communication with the terminal 100 and a vehicle.

The vehicle space control apparatus 300 may receive reservation information from the server 200 (S150), may determine a manner of partitioning an inner space of a vehicle based on the reservation information (S160), and may control an operation of a partition to correspond to the manner of partitioning the inner space (S170). Further, the vehicle space control apparatus 300 may perform a control operation to open a door of only a seat which is reserved (S180).

Figure 11:
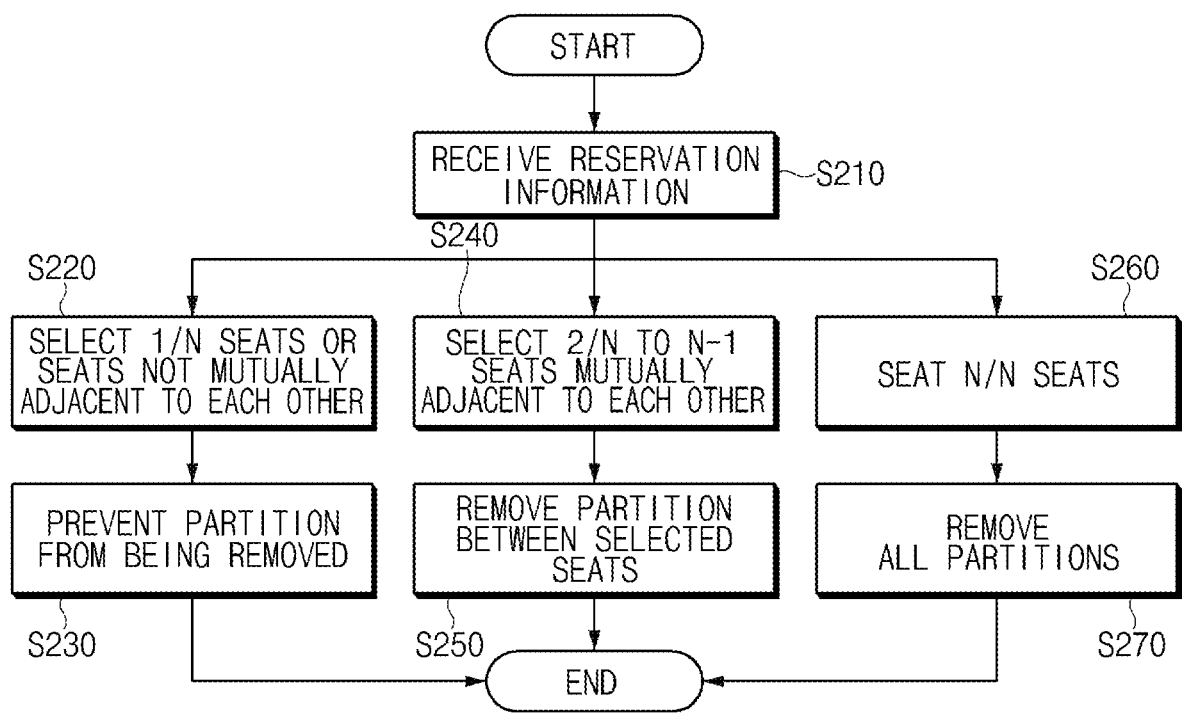
FIG. 11 is a flowchart illustrating an operating method of an apparatus for controlling a space of a vehicle, according to an embodiment of the present disclosure.

FIG. 11 is a flowchart illustrating an operating method of a vehicle space control apparatus, according to an embodiment of the present disclosure.

The controller 330 may receive the reservation information from the server 200 (S210). The controller 330 may perform a control operation to prevent the partition from operating, when use of one of total seats (n seats) inside the vehicle is determined as being selected, based on the reservation information, or when seats, which are adjacent to each other, are determined as being selected based on the reservation information (S220). In other words, the controller 330 may perform a control operation to prevent the partition from being removed (S230).

In addition, when determining two or (n−1) seats, which are adjacent to each other, of the total seats (e.g., n seats), as being selected based on the reservation information (S240), the controller 330 may perform a control operation to remove a partition between the selected seats (S250).

In addition, when determining n seats of the total seats (e.g., n seats) as being selected, based on the reservation information (S260), the controller 330 may perform a control operation to remove all of partitions.

Figure 12:
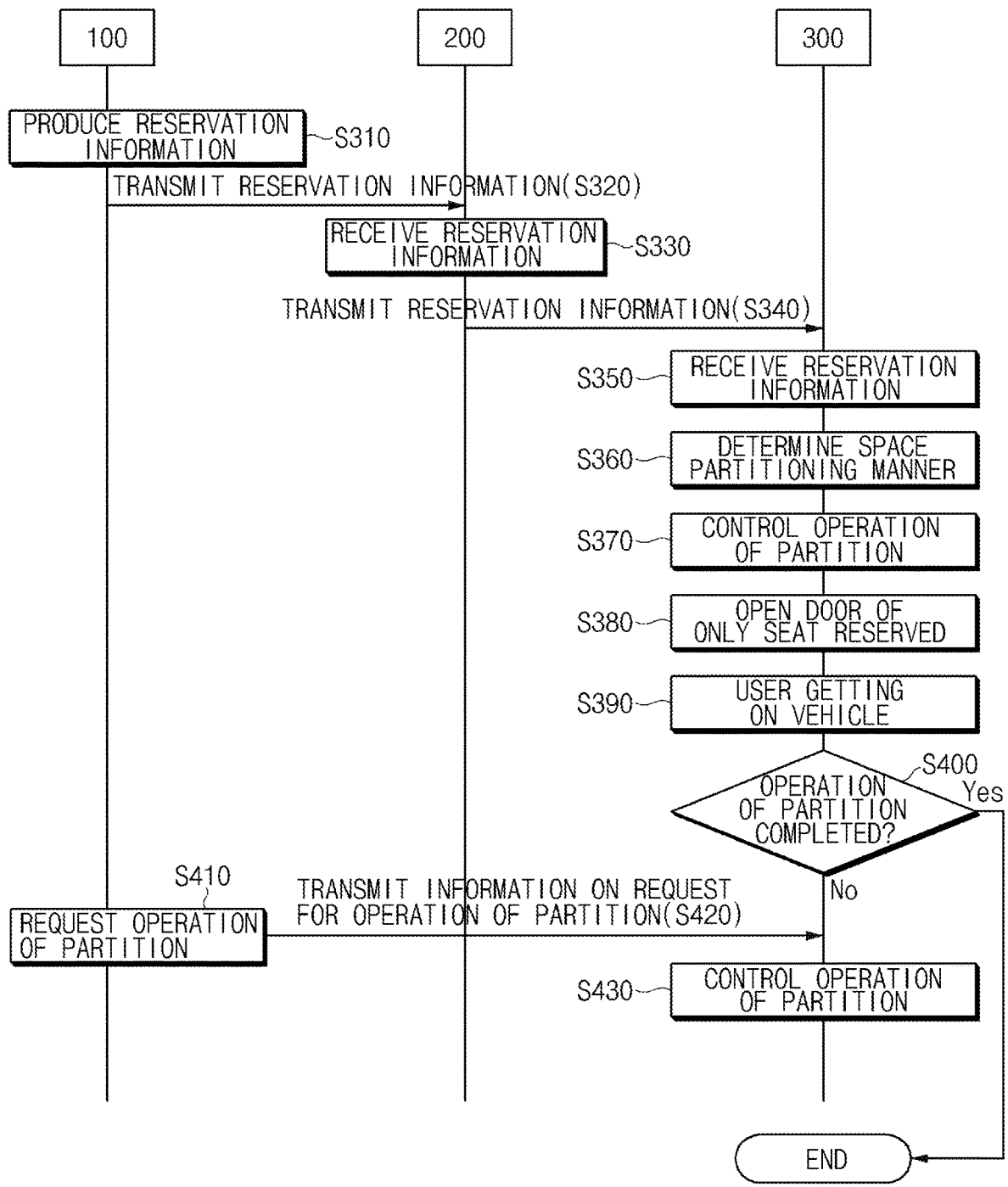
FIG. 12 is a flowchart illustrating an operating method of a system for controlling a space of a vehicle, according to another embodiment of the present disclosure.

FIG. 12 is a flowchart illustrating an operating method of a system for controlling a space of a vehicle, according to another embodiment of the present disclosure.

As illustrated in FIG. 12, the terminal 100 may produce reservation information based on an input of a user (S310). In S310, the terminal 100 may receive an input of a user including any one of control, an operation, and a voice of the user. According to an embodiment, the terminal 100 may be implemented with an electronic device (a smart phone, a smart pad, or a laptop computer). The terminal 100 may store an application to produce reservation information based on the input of the user. In this case, the reservation information may include vehicle information and seat information selected by the user. The terminal 100 transmits the reservation information, which is produced in S310, to the server 200 (S320).

The server 200 may receive the produced reservation information from at least one terminal 100 (S330). In addition, the server 200 may match the reservation information, which is produced from the at least one terminal 100, to each vehicle, and may transmit the reservation information to the vehicle matched to the reservation information (S340). To this end, the server 200 may make wireless communication with the terminal 100 and a vehicle.

The vehicle space control apparatus 300 may receive reservation information from the server 200 (S350), determine a manner of partitioning an inner space of a vehicle based on the reservation information (S360), and may control an operation of a partition to correspond to the manner of partitioning the inner space (S370). Further, the vehicle space control apparatus 300 may perform a control operation to open a door of only a seat which is reserved (S380).

The vehicle space control apparatus 300 may determine a user as getting on a vehicle (S390) and then may determine whether an operation of a partition is completed (S400). In other words, although the vehicle space control apparatus 300 controls the operation of the partition in S370, when the vehicle space control apparatus 300 does not determine the operation of the partition as being completed as in the space partitioning manner determined in S360, the vehicle space control apparatus 300 may receive the information on the request for the operation of the partition, which is produced by the terminal 100 (S410 and S420), and may control the operation of the partition based on the received information on the request for the operation of the partition (S430).

Figure 13:
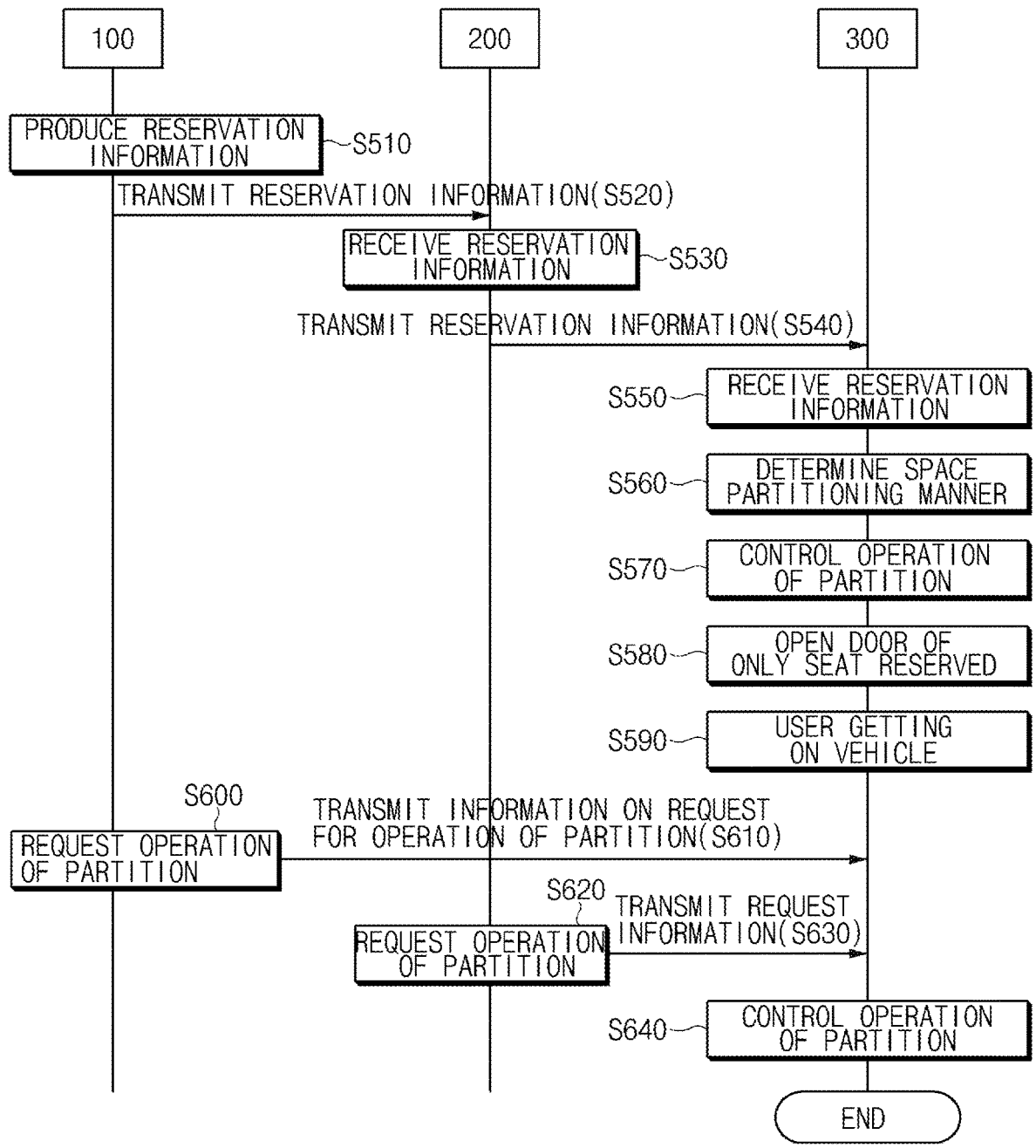
FIG. 13 is a flowchart illustrating an operating method of a system for controlling a space of a vehicle, according to another embodiment of the present disclosure.

FIG. 13 is a flowchart illustrating an operating method of a system for controlling a space of a vehicle, according to another embodiment of the present disclosure.

Since the descriptions of S510 to S580 in FIG. 13 are identical to the descriptions of S310 to S380 in FIG. 12, those skilled in the art may understand S510 to S580 by making reference to the descriptions of S310 to S380 in FIG. 12. In addition, the vehicle space control apparatus 300 may receive information on a request for an operation of a partition from the terminal 100 (S610), when the information on the request for the operation of the partition is produced by the terminal 100 (S600), after a user is determined as getting on a vehicle (S590). In addition, the terminal 100 may produce information on a request for removing a partition between a user and an occupant, when there is an input corresponding to a request for removing a partition of the user as the user gets to know an occupant having a seat adjacent to a seat of the user, after the user gets on the vehicle.

Alternatively, the vehicle space control apparatus 300 may receive information on a request for an operation of a partition from the server 200 (S630), when the information on the request for the operation of the partition is produced by the server 200 (S620). The server 200 may produce information on a request for removing a partition between a user and an occupant, when there is a history that the user has got on the vehicle with the occupant having the seat adjacent to the seat of the user, after the user gets on the vehicle, based on a history of previously received reservations, in S620.

The vehicle space control apparatus 300 may control the operation of the partition based on the information received in S610 and S630 (S640).

Figure 14:
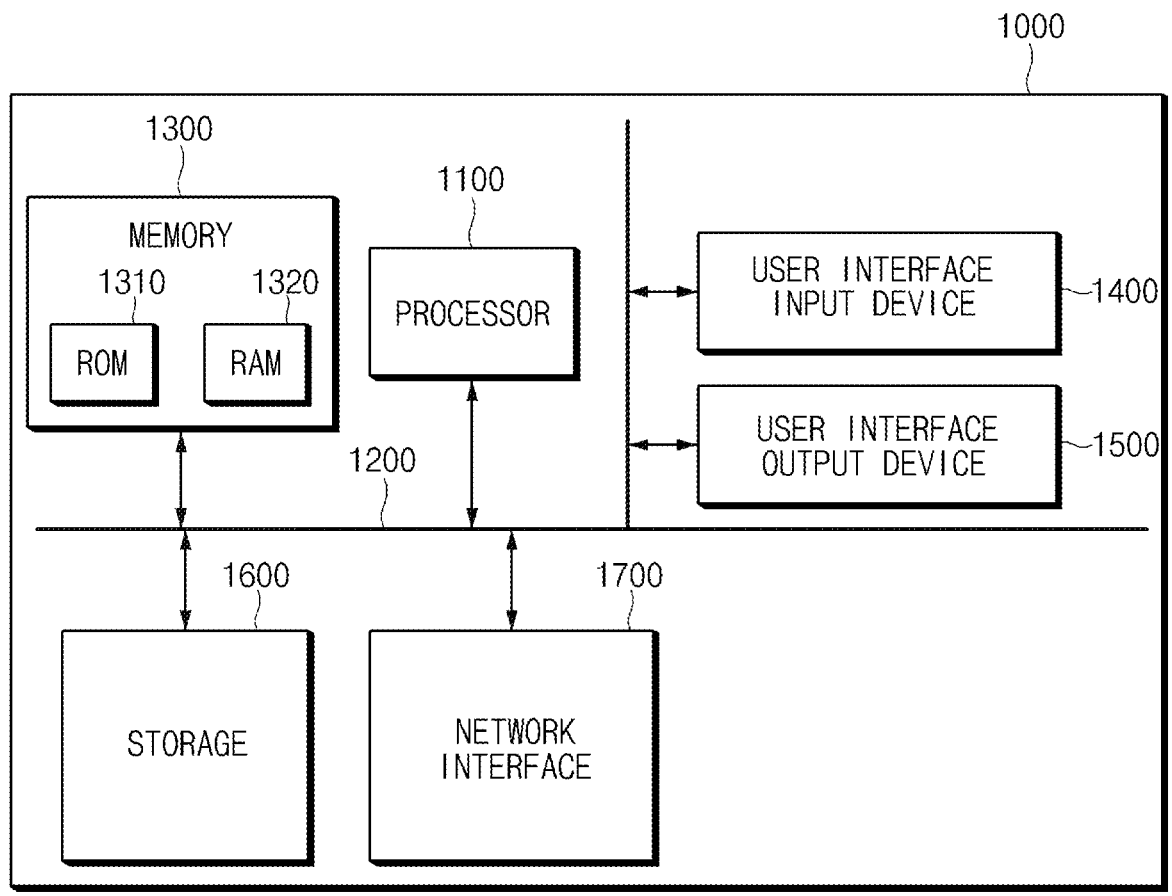
FIG. 14 is a block diagram illustrating a computing system to execute the method, according to an embodiment of the present disclosure.

FIG. 14 is a block diagram illustrating a computing system to execute a method, according to an embodiment of the present disclosure.

Referring to FIG. 14, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and the storage medium may reside as separate components of the terminal of the user.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure According to an embodiment of the present disclosure, the apparatus, the system, and the method for controlling the space of the vehicle have an effect that the users moving similar routes feel comfortable. In addition, costs for the car pool service may be saved, and the eco-friendly transportation may be provided. Further, according to the apparatus, the system, and the method for controlling the space of the vehicle, the occupant may be prevented from feeling uncomfortable due to the operation of the partition and the safety accident may be prevented from being basically caused as the partition is provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a space of a vehicle, the apparatus comprising:
    a communication device configured to receive reservation information; and
    a controller configured to:
        determine a manner of partitioning an inner space of the vehicle based on the reservation information, and
        control an operation of one or more partitions to correspond to the manner of partitioning the inner space,
    wherein the reservation information includes seat information selected by an user,
    wherein the one or more partitions move along a corresponding rail,
    wherein the corresponding rail includes a first rail, a second rail perpendicular to the first rail, and a curved rail connected to the first rail and the second rail, and
    wherein the one or more partitions are positioned on the first rail when the inner space of the vehicle is partitioned, the one or more partitions are positioned on the second rail when the inner space of the vehicle is not partitioned.

2. The apparatus of claim 1, wherein the controller is configured to, when the reservation information indicates that one vehicle seat is selected for use, prevent the operation of one partition from being controlled among the one or more partitions.

3. The apparatus of claim 1, wherein the controller is configured to, when the reservation information indicates that vehicle seats that are adjacent to each other are selected for use, perform a control operation to remove a partition between the adjacent vehicle seats among the one or more partitions.

4. The apparatus of claim 1, wherein the controller is configured to, when the reservation information indicates that all vehicle seats inside the vehicle are selected for use, perform a control operation to remove all of the one or more partitions between the vehicle seats.

5. The apparatus of claim 1, wherein the one or more partitions are configured to be disposed at a position according to a position of one or more respective vehicle seat inside the vehicle.

6. The apparatus of claim 1, wherein the controller is configured to perform a control operation to open a door of a vehicle seat that is selected for use, based on the reservation information.

7. A system for controlling a space of a vehicle, the system comprising:
    a terminal configured to produce first reservation information;
    a server configured to receive the first reservation information from the terminal; and
    a vehicle space control apparatus configured to:
        receive the first reservation information from the server,
        determine a manner of partitioning an inner space of the vehicle, and
        control an operation of one or more partitions to correspond to the manner of partitioning the inner space,
    wherein the reservation information includes seat information selected by an user,
    wherein the one or more partitions move along a corresponding rail,
    wherein the corresponding rail includes a first rail, a second rail perpendicular to the first rail, and a curved rail connected to the first rail and the second rail, and
    wherein the one or more partitions are positioned on the first rail when the inner space of the vehicle is partitioned, the one or more partitions are positioned on the second rail when the inner space of the vehicle is not partitioned.

8. The system of claim 7, wherein the server receives second reservation information for remaining vehicle seats when not every vehicle seat inside the vehicle is selected for use.

9. The system of claim 7, wherein the vehicle space control apparatus determines whether the operation of the one or more partitions is completed before a user having the first reservation information gets on the vehicle.

10. The system of claim 9, wherein, when the operation of the one or more partitions is determined as being incomplete before the user gets on the vehicle, the vehicle space control apparatus receives information regarding a request for the operation of the one or more partitions from the terminal and controls the one or more partitions to operate based on the received information.

11. The system of claim 9, wherein the vehicle space control apparatus receives information regarding a request for the operation of the one or more partitions from the terminal, and controls the one or more partitions to operate based on the received information after the user gets on the vehicle.

12. The system of claim 9, wherein the vehicle space control apparatus receives information on a request for the operation of the one or more partitions from the server, and controls the one or more partitions to operate based on the received information after the user gets on the vehicle.

13. A method for controlling a space of a vehicle, the method comprising:
    producing first reservation information in a terminal;
    receiving, by a server, the first reservation information from the terminal;
    receiving the first reservation information from the server; and
    determining a manner of partitioning an inner space of the vehicle to control an operation of one or more partitions to correspond to the manner of partitioning the inner space, wherein the reservation information includes seat information selected by an user, wherein the one or more partitions move along a corresponding rail, wherein the corresponding rail includes a first rail, a second rail perpendicular to the first rail, and a curved rail connected to the first rail and the second rail, and wherein the one or more partitions are positioned on the first rail when the inner space of the vehicle is partitioned, the one or more partitions are positioned on the second rail when the inner space of the vehicle is not partitioned.

14. The method of claim 13, wherein the receiving the first reservation information from the server includes receiving second reservation information for remaining vehicle seats when not every vehicle seat is selected for use.

15. The method of claim 13, further comprising determining whether the operation of the one or more partitions to correspond to the manner of partitioning the inner space is completed before the user having the first reservation information gets on the vehicle.

16. The method of claim 15, further comprising, when the operation of the one or more partitions is determined to be incomplete before the user gets on the vehicle:

receiving information on a request for the operation of the one or more partitions from the terminal; and controlling the one or more partitions to operate based on the information on the received request.

17. The method of claim 16, wherein the controlling the operation of the one or more partitions includes, when one of vehicle seats is selected for use based on the first reservation information performing a control operation to prevent the one or more partitions from being removed.

18. The method of claim 16, wherein the controlling the operation of the one or more partitions includes, when adjacent vehicle seats are selected for use based on the first reservation information, performing a control operation to remove a partition between the adjacent vehicle seats among the one or more partitions.

19. The method of claim 16, wherein the controlling the operation of the one or more partitions includes, when all vehicle seats inside the vehicle is selected for use based on the reservation information performing a control operation to remove the one or more partitions.

20. The method of claim 13, further comprising, after the controlling the operation of the one or more partitions, performing a control operation to open a door of a vehicle seat, which is selected for use, based on the first reservation information.

* * * * *